H. A. CARHART.
TYPE WRITING MACHINE.
APPLICATION FILED OCT. 4, 1916.

1,274,985.

Patented Aug. 6, 1918.

WITNESSES
L. Nelson
R H Strother

INVENTOR
Herbert A Carhart
By Jacob Felbel
HIS ATTORNEY

UNITED STATES PATENT OFFICE.

HERBERT A. CARHART, OF SYRACUSE, NEW YORK, ASSIGNOR TO REMINGTON TYPEWRITER COMPANY, OF ILION, NEW YORK, A CORPORATION OF NEW YORK.

TYPE-WRITING MACHINE.

1,274,985.  Specification of Letters Patent.  Patented Aug. 6, 1918.

Application filed October 4, 1916. Serial No. 123,668.

*To all whom it may concern:*

Be it known that I, HERBERT A. CARHART, citizen of the United States, and resident of Syracuse, in the county of Onondaga and State of New York, have invented certain new and useful Improvements in Type-Writing Machines, of which the following is a specification.

My invention relates to typewriting and similar machines and more particularly to means for controlling the carriages of such machines when said machines are being handled or moved about.

When a typewriting machine is picked up to be carried about, or when it is being moved about for any reason, it is likely to be turned on one side, and if the right-hand side of the machine is turned downward the carriage runs down rapidly by gravity to the extreme right-hand end of its travel where it is arrested with a bang or severe jar. If the left-hand end of the machine is turned downward the whole weight of the carriage, in addition to the pressure of the carriage spring, comes on the feed dogs and feed rack; and if the machine happens to be set down hard in this position a severe strain is brought upon these parts, particularly on the feed dog that is in engagement with the rack. My invention has for its principal object to prevent shock and injury to the machine from the causes mentioned. I have provided means for locking the carriage in a certain position so that it cannot run in either direction and combined with said lock a means for releasing the carriage from the escapement devices, so that in handling the machine no strain can come on said devices.

I have shown the invention applied to a portable machine, but it is also applicable to heavier machines and in fact it is useful on any machine, when said machine is being shipped or for any other reason being transported or moved about or tilted up.

To the above and other ends which will hereinafter appear, my invention consists in certain features of construction and combinations and arrangements of parts, all of which will be fully set forth herein and particularly pointed out in the claims.

In the accompanying drawings.

Figure 1:
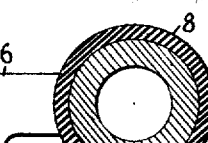
Figure 1 is a front to rear vertical sectional view showing the carriage of a typewriting machine having my invention embodied therein and some parts of the stationary framework, my locking and carriage releasing devices being shown in carriage locking and in escapement releasing positions.

In all of the views parts have been omitted or broken away as has been found convenient.

The Remington Junior typewriter to which my invention is here shown applied, is well-known and only so much of the machine is shown in the drawings as is necessary to illustrate the application of my invention thereto.

Figure 2:
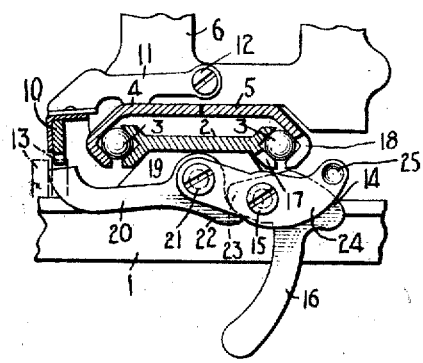
Fig. 2 is a view similar to part of Fig. 1 but showing the parts in their normal positions which they occupy when the machine is in use.
Figure 3:
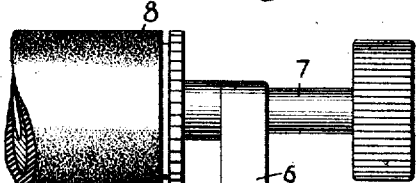
Fig. 3 is a fragmentary front view partly in section of one end of the carriage and associate parts, the carriage lock being shown in locking position.
Figure 4:
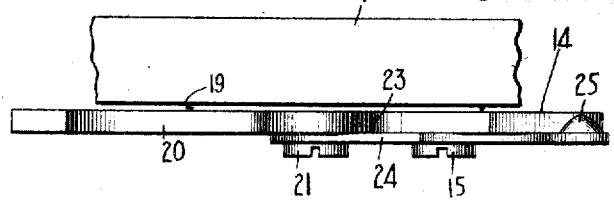
Fig. 4 is an enlarged top view of the locking and carriage releasing devices with a portion of the framework.

The main frame of the machine comprises side plates each of which includes a bar 1. A carriage rail 2 is secured near its ends to said bars, the rail in this machine consisting of a straight bar with ball bearing grooves in its front and rear edges for coöperation with anti-friction balls 3, which balls also coöperate with a rear rail 4 and a front rail 5 constituting parts of the typewriter carriage, said rails 4 and 5 having grooves facing those in the fixed rail 2. Said carriage also comprises end pieces 6 secured to the rails 4 and 5 and having journaled therein the axle 7 of a platen 8. The carriage is drawn toward the left by means of a spring drum, not shown, and its motion is controlled by escapement mechanism which in this machine comprises a feed rack 10 mounted at its ends on the rear ends of arms 11 which are pivoted at 12 to the end pieces 6 of the carriage. The arms 11 normally rest on the rail 4, as shown in Fig. 2, and in this position of the parts the carriage is controlled by feed dogs 13, the position of which is indicated by dotted lines in Figs. 1 and 2. The carriage can be released from its escapement devices by lifting the feed rack 10 as shown in Fig. 1. The machine contains a key, not shown, for thus releasing the carriage.

In order to lock the carriage I pivot a locking lever 14 beneath the rail 2 on a pivot screw 15 which is screwed into a suitable lug 19 projecting inward from the stationary bar 1. Said lever has a handle 16 extending downward below the bar 1 where it can be reached by the operator. A slot is cut in the rail 2, as indicated at 17, and at a suitable point a slot 18 is also cut in the rail 5 of the carriage, so that its side walls or shoulders are transverse to the direction of travel of the carriage. The construction is such that by moving the carriage to such position that the slot 18 registers with the lever 14, said lever can be turned up to the position shown in Fig. 1 where it will enter the slots 17 and 18 and effectually lock the carriage against motion in either direction. The slot 17 can, of course, be omitted, if desired, but the lock is rendered stiffer in its action by passing through a slot in a stationary part.

Figure 5:
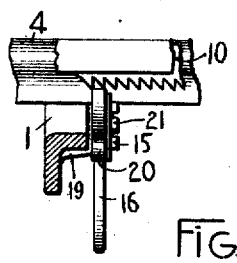
Fig. 5 is a fragmentary rear view of the carriage feed rack and a lifting lever therefor.

In order to raise the rack 10 to its releasing position, as shown in Fig. 1, a lever 20 is provided, said lever being pivoted on a screw 21 screwed into the lug 19 back of the screw 15. The lever 20 has an arm extending toward the rear and lying beneath the rack 10 in such position that when said rear arm is elevated the rack will be raised. Said lever is of such width that it will not go between the teeth of the rack 10 as is indicated in Fig. 5.

The lever 20 has a short arm 22 and the lever 14 has a cam arm 23 lying above the arm 22 and in such position and of such form that when the parts are in their normal unlocking position shown in Fig. 2 the rear arm of the lever 20 is dropped out of contact with the rack 10 but when the handle 16 is drawn toward the front of the machine to locking position as shown in Fig. 1 then the arm 23 of the lever 14 cams down the arm 22 of the lever 20 and thus raises the rack 10 out of engagement with the dogs 13. In thus drawing the handle to the front of the machine, it will be understood that the lever arm 14 engages the previously alined notch before the release lever 20 can raise the rack wholly from the dog, thus insuring against accidental release of the carriage before it is locked. The cam arm 23 has a dwell against which the arm 22 lies when the parts are in the position shown in Fig. 1, so that the weight of the rack does not tend to restore the lever 14 to normal position. The levers 14 and 20 are separately pivoted and arranged edge to edge or in tandem form.

In order to hold the lever 14 in either locking or unlocking position I have provided a detent which as here shown consists of a flat spring 24, said spring being secured in position by the two screws 15 and 21 and acting as a sort of washer to guide the two levers 14 and 20. At its forward end the spring 24 has a dome-shaped lug 25 struck out therefrom toward the right in position to engage that arm of the lever 14 which acts as a lock. When the parts are in the normal position shown in Fig. 2 this arm of the lever is beneath the dome 25 and when the parts are in the locking position said arm is above said dome, which dome being under spring tension toward the right prevents accidental displacement of the parts from either of their two positions.

The slots 17 and 18 do not interfere with the action of the ball bearing in the Remington Junior machine because in that machine the ball in the front raceway never gets as near to the end of the carriage nor of the stationary rail as said slots.

It will be noted that the locking and releasing devices are extremely simple and inexpensive and entirely effectual for their purpose.

Various changes can be made in the details of construction and arrangement without departing from my invention.

What I claim as new and desire to secure by Letters Patent, is:

1. In a typewriting machine, the combination of a fixed part of the machine supporting a fixed carriage rail 2 which is provided with a notch, a carriage bar also provided with a notch, and a locking device mounted on the fixed part of the machine and normally out of engagement with both said notches and adapted to enter said notches when the carriage has been moved so that they aline.

2. In a typewriting machine, the combination with a carriage and a stationary frame including a side bar, of a carriage lock comprising a locking lever pivoted on said side bar and having a depending arm constituting a handle, and another arm adapted to enter a notch in said carriage so arranged as to lock the latter in both directions; and a spring detent having a projection adapted to engage one side of said locking lever to hold said lever in one position and to engage the other side of said lever to hold the latter in its other position.

3. In a typewriting machine, the combination with a carriage and feed devices therefor, of means for first locking said carriage and then releasing the feed mechanism.

4. In a typewriting machine, the combination with a carriage and feed devices therefor, of means for locking said carriage, and simultaneously acting means for separating said feed devices, the locking means operating to hold the carriage before the separation of the feed devices.

5. In a typewriting machine, the combination with a carriage, feeding devices therefor and a stationary part of the machine, of a contrivance mounted upon the stationary part of the machine and comprising parts adapted first to lock the carriage and then to separate the carriage feeding devices.

6. In a typewriting machine, the combination with a carriage and escapement mechanism therefor, of a lock for locking said carriage, and means operating in conjunction with said lock for releasing said carriage from its escapement mechanism, after the carriage lock has become effective to prevent endwise movement of the carriage.

7. In a typewriting machine, the combination of a carriage having a bar portion provided with a notch and having also a relatively movable feed rack, two separately pivoted levers, one arranged edgewise behind the other, one of said levers being a carriage locking lever, and the other a rack moving lever, one arm of the locking lever engaging one arm of the rack releasing lever, the other arm of the locking lever engaging the notch in the carriage, and the other arm of the releasing lever operating to move or release the feed rack.

8. In a typewriting machine, the combination with a carriage and escapement mechanism for said carriage, of a hand operated means which when operated first locks said carriage and then releases it from the control of said escapement mechanism whereby the machine can be moved about without allowing the carriage to run in either direction and without putting strain on said escapement mechanism.

9. In a typewriting machine, the combination with a carriage and escapement mechanism for controlling said carriage, of two tandem, separately fulcrumed levers, one operated by the other, one of said levers when operated serving first to lock the carriage and the other of said levers acting then to release the carriage from the control of said escapement mechanism.

10. In a typewriting machine, the combination of a carriage and escapement mechanism for controlling said carriage, a hand operated locking lever for locking said carriage, said lever having a cam portion, and means operated by said cam portion for releasing said carriage from the control of said escapement mechanism.

11. In a typewriting machine, the combination with a carriage and escapement mechanism for controlling said carriage, of a carriage lock, and associated carriage releasing means, said releasing means including a cam having a dwell, said cam effecting the release of the carriage when said lock is operated and said dwell holding the escapement mechanism in released position.

12. In a typewriting machine, the combination with a carriage and escapement mechanism for controlling said carriage, of a carriage lock, hand operated means for operating said lock, a lever for releasing said carriage from the control of its escapement mechanism, and a cam having a dwell and operated by said hand operated means, said cam operating said lever and said lever being held up by said dwell.

13. In a typewriting machine, the combination with a stationary rail and a carriage traveling on said rail, said rail and carriage each having a cross-cut slot therein, of a carriage lock adapted to be moved by hand into the two said slots when the carriage is in position to bring said slots into register.

14. In a typewriting machine, the combination with a stationary grooved rail, a roller-bearing carriage having a coöperating grooved rail, said stationary and carriage rails each having a cross-cut slot therein, and a hand-operated carriage-locking lever adapted to be moved into said slots.

15. In a typewriting machine, the combination with a stationary rail and a carriage traveling on said rail, said rail and carriage each having a cross-cut slot therein, of a carriage lock adapted to be moved by hand into the two said slots when the carriage is in position to bring said slots into register, and a carriage release device operated by said lock.

Signed at Syracuse, in the county of Onondaga and State of New York, this second day of October, A. D. 1916.

HERBERT A. CARHART.

Witnesses:
S. B. BARROWS,
JENNIE A. STEVENS.